July 8, 1952  I. L. LARSON  2,602,494
LEVER ACTUATED TIRE BEAD BREAKER WITH WHEEL SECURING MEANS
Filed Aug. 29, 1949  2 SHEETS—SHEET 1
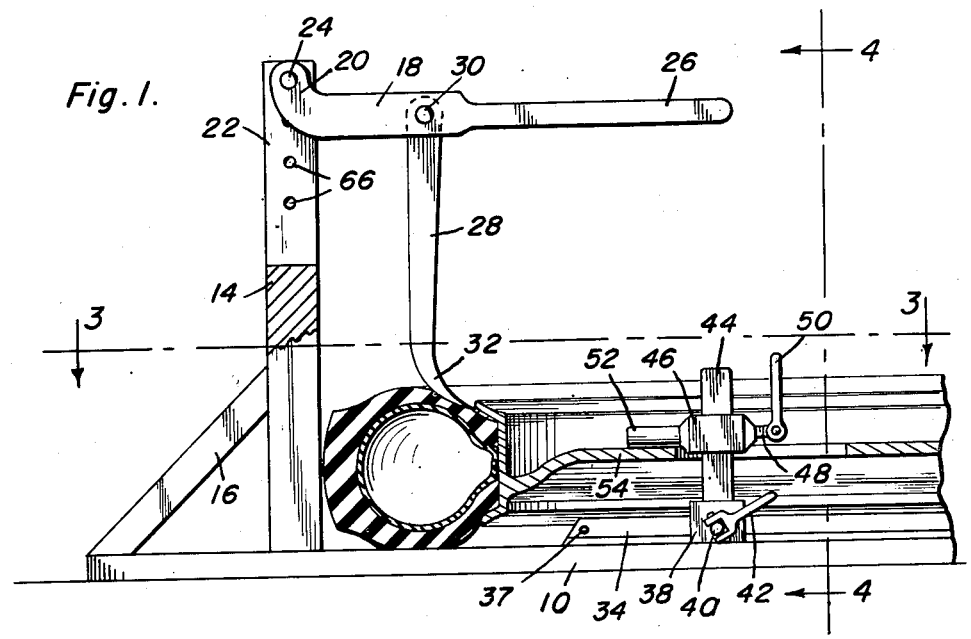
Fig. 1.
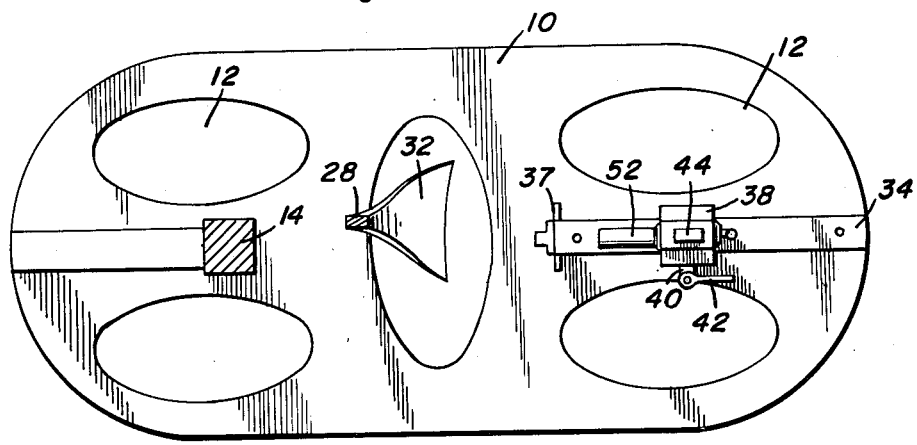
Fig. 3.
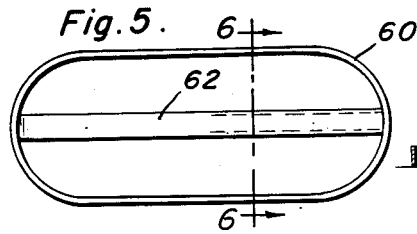
Fig. 5.
Fig. 6.
Ilo L. Larson
INVENTOR.
BY Clarence A. O'Brien
and Harvey B. Jacobson
Attorneys July 8, 1952  I. L. LARSON  2,602,494
LEVER ACTUATED TIRE BEAD BREAKER WITH WHEEL SECURING MEANS
Filed Aug. 29, 1949  2 SHEETS—SHEET 2

Ilo L. Larson
INVENTOR.

BY
Clarence A. O'Brien
and Harvey B. Jackson
Attorneys

Patented July 8, 1952

2,602,494

UNITED STATES PATENT OFFICE 2,602,494

LEVER ACTUATED TIRE BEAD BREAKER WITH WHEEL SECURING MEANS

Ilo L. Larson, Storm Lake, Iowa

Application August 29, 1949, Serial No. 112,892

1 Claim. (Cl. 157—1.17)

This invention relates to tire tools, and more particularly to a tool which aids in removing a tire bead from an automobile wheel.

An object of the invention is to provide a tire tool including pivotally mounted levers adapted to break the bond between a tire and the wheel it is positioned upon.

A further object of the invention is to provide means for holding the wheel of an automobile rigidly in place while the tire is being removed therefrom.

A still further object of the invention is to slidably adjust a means for holding a wheel in place while a tire is being removed therefrom in a novel manner.

Yet another object of the invention is to provide a tire tool for removing tires from automobile wheels which is simple in construction, strong, durable, and efficient in operation, and which can be easily manufactured at a relatively low cost.

These, together with the various ancillary objects of the invention which will later become apparent as the following description proceeds, are attained by this device, a preferred embodiment of which has been illustrated, by way of example only, in the accompanying drawings, wherein:

Figure 1 is an elevational view of the tire bead breaker comprising the present invention;

Figure 3 is a horizontal sectional view as taken along line 3—3 in Figure 1 and showing the tire bead breaker without an automobile wheel positioned thereon;

Figure 5 is a top plan view of an additional species of base member which can be used with the following described invention;

Figure 6 is a vertical sectional view as taken along line 6—6 in Figure 5.

Figure 2:
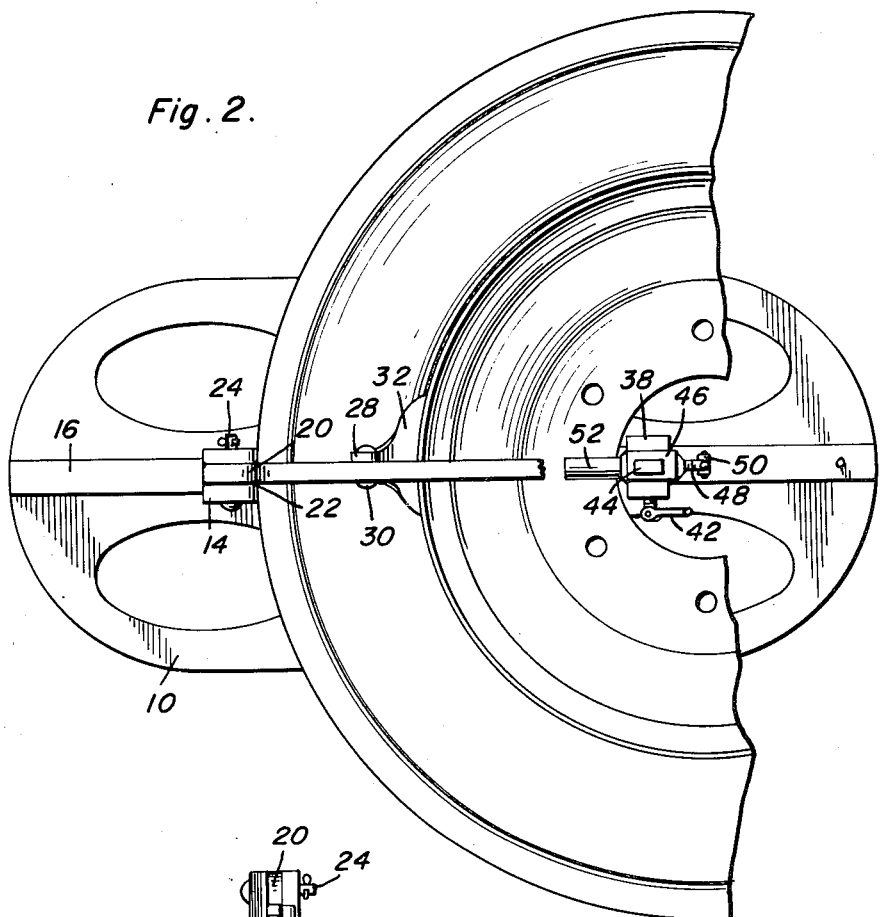
Figure 2 is a top plan view showing an automobile wheel with a tire thereon in position.
Figure 4:
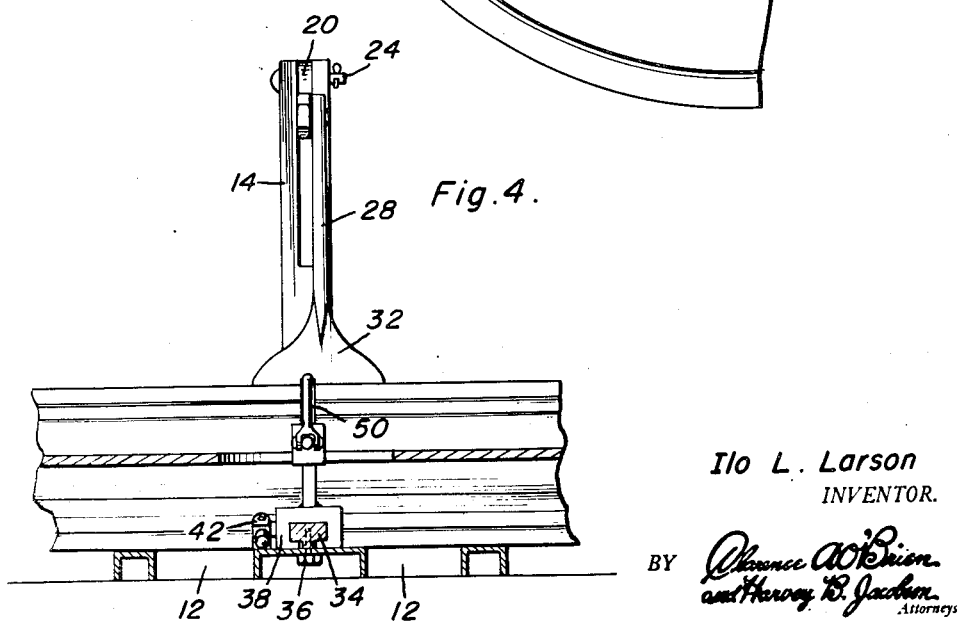
Figure 4 is a vertical sectional view as taken along line 4—4 in Figure 3.

With continued reference to the accompanying drawings wherein like reference numerals designate similar parts throughout the various views, reference numeral 10 is used to designate a base comprising one element of the present invention. The base 10 is formed with a plurality of holes 12 in order to lighten the weight thereof. A standard 14 is secured to the base at its bottom and is supported by the brace 16.

Pivotally attached to the standard 14 at its upper end thereof is one end of a lever 18 having an end 20 positioned within a slot 22 in the standard 14 and secured thereby by means of the pin 24. The other end of the lever 18 is shaped so as to provide a handle 26. A tire engaging arm 28 is pivotally attached to the lever 18 centrally thereof by means of pin 30. For effective engagement with a tire the free end of the arm 28 is formed with a curved blade 32 adapted for insertion under the rim of a wheel and in engagement with the tire bead.

A T-shaped guide member 34 is secured to the base longitudinally thereof by means of bolts 36, or the like, and is provided at its inner end with a suitable stop member 38. Upon the guide 34 is positioned a U-shaped slide 38 having a threaded aperture thereon. Threadedly engaged with the aperture in the slide is a set screw 40 with a handle 42 attached thereto. By turning a handle 42 the set screw can be brought into contact with the guide 34 whereby the slide 38 can be rigidly positioned. Upwardly extending from the slide 38 is a stud 44 of substantially rectangular cross section. Slidably positioned upon the stud 44 is a tubular clamp 46 having a threaded aperture therein. In threaded engagement with the aperture in the clamp 46 is a set screw 48 having a handle 50 attached at its outermost end thereto. By rotating the handle 50 the threaded set screw 48 can be brought into engagement with the stud 44 to rigidly maintain the clamp 46 at a determined location. An extending lug 52 is secured to the side of the clamp opposed from the threaded aperture.

The operation of the device is as follows:

The wheel having a tire thereon is placed upon the base with the tread of the tire adjacent the standard 14, as is best shown in Figures 1 and 2. The clamp 46 is then raised above the height of the disk 54 of the wheel, and the slide 38 is moved along the guide 34 until it is adjacent the disk 54. The handle 42 is then turned to rigidly secure the slide on the guide. Then the clamp is lowered so that the lug 52 is in positive engagement with the disk 54 at which time the handle 50 is turned to rigidly secure the clamp 46 to the stud 44. The end 32 of the arm 28 is then positioned for insertion under the rim of the wheel and for engagement with the tire bead. The handle 26 subsequently is depressed to thereby dislodge the tire bead from contact with the adjacent rim. When the bead has been broken away from the rim at one point, the clamp 46 may be raised and the wheel rotated to another position so that at another point the contact between the tire and the wheel rim may be broken.

This device is adjustable to any size wheel within the limits of the length of the guide 34 and the height of the stud 44. Since this tool eliminates slippage of the automobile wheel when pressure is exerted to force the tire away from the rim by the coaction between the lug 52 and the standard 14, it will greatly assist automobile servicing stations and garages in the changing of tires.

Referring now to Figures 5 and 6, another species of base separate from the oval moulded form base 10 of Figures 1 through 4 is shown. The base of Figures 5 and 6 comprises an oval rim 60 having the guide 62 extending the full length therebetween.

A plurality of apertures 66 may be cut in the standard 14 for selective reception of the pin 24. Thusly the lever 18 may be vertically adjusted for various sizes of tires.

Since from the foregoing, the construction and advantages of this tire tool is readily apparent, further explanation is believed to be unnecessary.

However, since numerous modifications in construction and design will readily occur to anyone skilled in the art after a consideration of the foregoing specification and accompanying drawings, it is not intended to limit the invention to the precise embodiment shown and described, but all suitable modifications and equivalents may be resorted to, falling within the scope of the appended claim.

Having described the invention, what is claimed as new is:

A tire bead breaker comprising an elongated base, a standard mounted on one end portion of the base, a hand lever pivotally mounted on the standard, a push bar pivotally mounted on said lever, a substantially T-shaped guide rail mounted centrally and longitudinally on the other end portion of the base, a C clamp mounted for sliding adjustment on said rail and including a securing screw, a post rising from said clamp, a vertically adjustable slide operable on the post, means for securing the slide in adjusted position, an arm projecting from the slide extending transversely with respect to the post and engageable with the web of a wheel placed on said base with its central opening surrounding said post to secure the wheel on the base, and a stop pin for the clamp mounted transversely in one end portion of the rail.

ILO L. LARSON.

REFERENCES CITED

The following references are of record in the file of this patent:

UNITED STATES PATENTS

| Number | Name | Date |
|---|---|---|
| D. 138,773 | Graves | Sept. 12, 1944 |
| 644,154 | Stark | Feb. 27, 1900 |
| 1,435,624 | Schwab | Nov. 14, 1922 |
| 1,646,511 | Weaver | Oct. 25, 1927 |
| 2,233,371 | Smith | Feb. 21, 1941 |
| 2,433,113 | Graves et al. | Dec. 23, 1947 |
| 2,449,960 | Toles | Sept. 21, 1948 |
| 2,478,214 | Turner | Aug. 9, 1949 |

FOREIGN PATENTS

| Number | Country | Date |
|---|---|---|
| 156,634 | Switzerland | Oct. 17, 1932 |